United States Patent [19]
Araujo et al.

[11] Patent Number: 5,212,120
[45] Date of Patent: May 18, 1993

[54] PHOTOSENSITIVE GLASS

[75] Inventors: Roger J. Araujo, Horseheads; Nicholas F. Borrelli, Elmira; Dennis W. Smith, Corning, all of N.Y.

[73] Assignee: Corning Incorporated, Corning, N.Y.

[21] Appl. No.: 900,667

[22] Filed: Jun. 19, 1992

Related U.S. Application Data

[63] Continuation-in-part of Ser. No. 713,429, Jun. 10, 1991, abandoned.

[51] Int. Cl.$^5$ .......................... C03C 4/06; C03C 3/095
[52] U.S. Cl. .......................................... 501/13; 501/64
[58] Field of Search .................................. 501/13, 64

[56] References Cited

U.S. PATENT DOCUMENTS

| | | | |
|---|---|---|---|
| 2,515,936 | 7/1950 | Armistead, Jr. | 501/57 |
| 2,515,937 | 7/1950 | Stookey | 501/66 |
| 2,515,943 | 7/1950 | Stookey | 501/57 |
| 4,017,318 | 4/1977 | Pierson et al. | 501/13 |
| 4,057,408 | 11/1977 | Pierson et al. | 501/57 |
| 4,160,654 | 7/1979 | Bartholomew et al. | 65/30 E |
| 4,407,966 | 10/1983 | Kerko et al. | 501/13 |
| 4,549,894 | 10/1985 | Araujo et al. | 501/13 |

OTHER PUBLICATIONS

World Patents Index, Week 8002, Derwent Publications Ltd., London, GB; AN 80-03343C & SU-A-659 540 (As Geor Cybernetics) 30 Apr. 1979 (Abstract).

Glass Technology, vol. 20, No. 4, Aug. 1979, Sheffield, GB, pp. 149-157; G. P. Smith: 'Some Light on Glass', p. 150, right column, p. 151, left column.

Scientific American, vol. 264, No. 4, Apr. 1991, New York, U.S., pp. 56-61; D. M. Trotter, Jr.: 'Photochromic and Photosensitive Glass' (whole document).

Primary Examiner—Mark L. Bell
Attorney, Agent, or Firm—Milton M. Peterson; Clinton S. Janes, Jr.

[57] ABSTRACT

A photosensitive borosilicate glass which consists essentially in calculated weight percent on an oxide basis of 20-80% $SiO_2$, 8-40% $B_2O_3$, 0-6% $Li_2$, 0-28% $Na_2$, 0-25% $K_2O$, the total $Na_2O+K_2O$ being 10-28%, 0-18% $Al_2O_3$ and minor amounts of photosensitizing agents silver, cerium oxide, antimony oxide and bromine and/or chlorine, the cation ratio of $R_2O$—$Al_2O_3$ to $B_2O_3$ being at least 0.6.

8 Claims, 1 Drawing Sheet

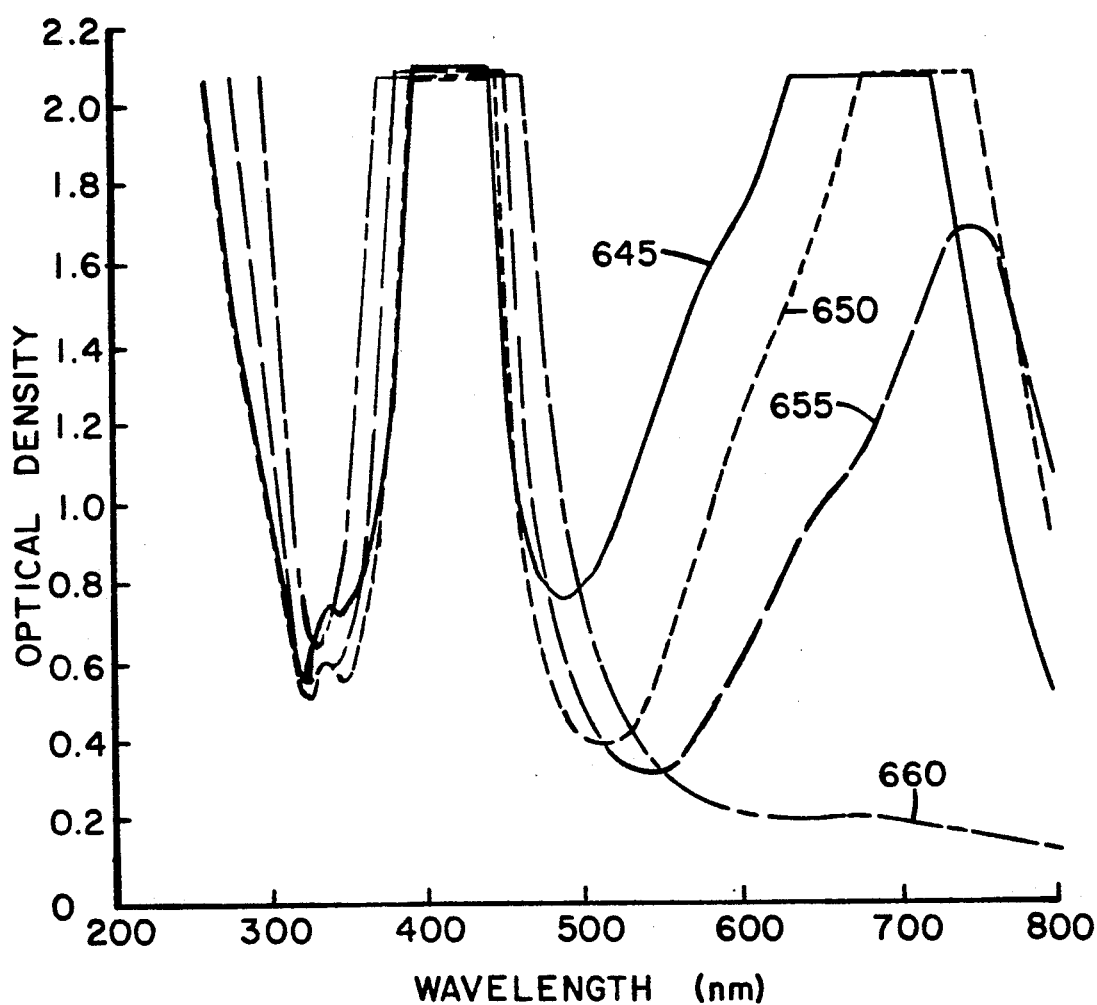

PHOTOSENSITIVE GLASS

This application is a Continuation-In-Part of Ser. No. 713,429 filed Jun. 10, 1991, now abandoned.

FIELD OF THE INVENTION

The filed is borosilicate glasses in which color changes may be induced by a combination of exposure to light and thermal treatment.

BACKGROUND OF THE INVENTION

A photosensitive glass undergoes change in those areas that are exposed to short wave radiations, such as ultraviolet light. As a result, the exposed areas are capable of changing color when heated. The process of coloration essentially involves producing metal particles in a glass by photoexcitation, followed by thermal treatment.

The phenomenon was initially observed by Dalton in copper-containing glasses as described in U.S. Pat. Nos. 2,326,012 and 2,422,472. Armistead observed the phenomenon in silver-containing glasses as reported in U.S. Pat. No. 2,515,936, and Stookey observed it in gold-containing glasses as reported in U.S. Pat. No. 2,515,937. In the case of metallic silver, the colors observed were predominantly yellow or brown.

It has been conventional wisdom that the presence of boric oxide ($B_2O_3$) in a glass composition tends to weaken photosensitivity. It followed, therefore, that $B_2O_3$ should be avoided, or at least minimized, in photosensitive glasses. The Armistead patent indicates that up to 10 wt. % $B_2O_3$ can be tolerated under certain conditions, but the oxide does not appear in any of the exemplary compositions in the patent. Subsequent patents, including later filed U.S. Pat. Nos. 2,515,943 (Stookey), usually restrict $B_2O_3$ to not more than 5%. Consequently, photosensitive glasses have had alkali silicate compositions, that is, they have been composed essentially of alkali metal oxides, divalent metal oxides and silica. In contrast, silver halide photochromic glasses are all based on borosilicate base compositions.

It has long been known that a more varied combination of physical properties can be achieved in borosilicate glasses than can be readily obtained in glasses based on silica alone as the glass former. For example, laboratory ware is usually produced from a borosilicate glass rather than from less expensive lime glasses. This is because the borosilicate is equally easy to melt, has better chemical durability and provides a lower coefficient of thermal expansion.

The restrictions imposed on boric oxide content in the patents cited above, therefore, significantly diminishes the flexibility of the glass chemist in designing photosensitive glasses. This is particularly true of glasses having the physical properties desired for special applications. Accordingly, it would be desirable to have photosensitive glasses available with relatively large $B_2O_3$ contents.

SUMMARY OF THE INVENTION

Our invention resides in photosensitive borosilicate glasses which have base glass compositions, calculated in weight percent on an oxide basis from the glass batch, that consist essentially of 20–80% $SiO_2$, 8–40% $B_2O_3$, 0–6% $Li_2O$, 0–28% $Na_2$, 0–25% $K_2O$, the $Na_2O+K_2O$ content being 10–28% and 0–18% $Al_2O_3$. The cation ratio of ($R_2O-Al_2O_3$):$B_2O_3$ ($R_2O$ being $Li_2O+Na_2O+K_2O$) must be at least 0.6, preferably is at least 0.75, and optimally is about 1. Alkaline earth metal oxides (RO) are preferably absent, but may be tolerated in amounts such that the cation ratio RO:$R_2O$ is not over 0.25. In addition the glasses will contain 0.05 to 0.3% Ag, an effective amount up to 0.05% $CeO_2$, an effective amount up to 0.5% $Sb_2O_3$ and 0 to 0.3% Cl and/or Br to provide photosensitivity.

A preferred base glass composition range consists essentially of 50–65% $SiO_2$, 10–20% $B_2O_3$, 5–6% $Li_2O$, 0–25% $Na_2O$, 0–20% $K_2O$, the $Na_2O+K_2O$ content being 10–25%, and 0–10% $Al_2O_3$, the cation ratio of ($R_2O-Al_2O_3$):$B_2O_3$ being at least 0.75 and the cation ratio of RO:$R_2O$ being not over 0.25.

PRIOR ART

In addition to the several patents previously mentioned, attention is also directed to U.S. Pat. Nos. 4,017,318 and No. 4,057,408 (Pierson et al.). These patents describe polychromatic glasses which are capable of having a range of colors developed by certain combinations of radiation exposure and thermal treatment. The colors result from a unique combination of alkali fluoride-silver halide microcrystals which are nucleated by silver particles. The color is the result of subsequent reduction of silver on the microcrystals.

BRIEF DESCRIPTION OF THE DRAWING

The single FIGURE in the accompanying drawing is a graphical representation of light transmission in glasses in accordance with the invention.

DESCRIPTION OF THE INVENTION

Our invention provides a unique family of glasses. These glasses are characterized by the combination of a high $B_2O_3$ content and the ability of having photosensitive coloration developed in the glass. This combination provides a variety of advantages over prior alkali silicate, photosensitive glasses.

From a color standpoint, sharper adsorption bands than previously available can be induced. It is also possible to develop a wider range of colors than heretofore. In particular, green colors were induced in certain glasses containing both lithium and potassium oxides.

The present borosilicate glasses permit photosensitive colors to be induced in conjunction with combinations of physical properties not easily obtainable in alkali silicate glasses. Thus, photosensitive glasses with a wider range of combinations of chemical durability, coefficients of thermal expansion and viscosities are now possible.

Our invention is predicated on the theory that strong photosensitivity in borosilicate glasses is dependent on the ratio of total alkali metal oxides ($R_2O$) to boron oxide. Thus, our studies indicate that, in glasses containing large amounts of boron, the presence of an alkali metal oxide ($R_2O$) in modest amounts does not produce nonbridging oxygen atoms. Rather, tetrahedrally bonded boron atoms are produced instead. It is our belief then that these glasses fail to exhibit photosensitivity because they contain no non-bridging oxygen atoms to act as hole traps.

As the ratio of $R_2O$ to $B_2O_3$ is increased in a borosilicate glass composition, the ratio ultimately reaches a level where some non-bridging oxygen atoms occur in addition to the tetrahedral boron atoms. Thus, we believe that photosensitivity in a borosilicate glass depends on the occurrence of hole-trapping at non-bridging oxygen atoms. In turn, this phenomenon occurs only with a relatively high level of alkali metal oxide present.

The presence of alumina ($Al_2O_3$) in a composition must also be considered. The addition of $Al_2O_3$ to an alkali silicate glass tends to eliminate non-bridging oxygen atoms. This then requires an even higher alkali metal oxide content. Accordingly, it is a key feature of our invention that the cation ratio of total alkali metal oxide content minus alumina content to boric oxide, that is, ($R_2O$—$Al_2O_3$):$B_2O_3$ must be high enough for the glass to contain a high density of non-bridging oxygen atoms.

Our glasses are members of a basic composition family that, in calculated weight percent on an oxide basis and in its broadest aspect, consists essentially of 20-80% $SiO_2$, 8-40%, $B_2O_3$, 0-6% $Li_2O$, 0-28% $Na_2O$, 0-25% $K_2O$, the $Na_2O + K_2O$ content being 10-28% and 0-18% $Al_2O_3$. The cation ratio ($R_2O$—$Al_2O_3$):$B_2O_3$ is at least 0.6, and preferably is at least 0.75.

Silica is, of course, the principal glass former. At least 20% is required, and we prefer at least 50%. Lesser amounts may result in thermal reduction of silver, as well as poor chemical durability. In general, amounts over 65% are unnecessary, but may be operative if desired.

The presence of substantial amounts of boric oxide ($B_2O_3$) is a key feature of the present glasses. At least ten percent is generally desired for improved durability and lower coefficient of expansion. However, large amounts require large $R_2O$ contents to avoid loss of photosensitivity, thereby destabilizing the glass. Accordingly, we prefer a $B_2O_3$ content in the range of 10-20%.

It is customary to include a small amount of alumina as a stabilizing factor in borosilicate glasses. However, since it does militate against non-bridging oxygen atoms, and hence photosensitivity, its use must be limited. It may be tolerated in amounts up to 18% by weight, providing the content of alkali metal oxide ($R_2O$) is relatively high. Since this may be undesirable, we prefer to limit the alumina content to no more than 10%, and to omit it if not needed.

The alkali metal oxide content ($R_2O$) is determined in large part by the amount necessary to function with the $B_2O_3$. Thus, we require at least 10% total content, but not over 28%. Within this range, the amount selected will be largely governed by the relationship of $R_2O$—$Al_2O_3$ to $B_2O_3$. This cation ratio is employed because of the disparity in weights of the alkali metals and aluminum. The ratio must exceed about 0.6 to provide the necessary non-bridging atoms for photosensitivity. The variety and intensity of photosensitive colors attainable increase as the ratio increases. Also, lower silver contents may be used. However, at high values, chemical durability is lost and coefficients of expansion may increase. Therefore, a ratio of at least 0.75 is preferred, and on the order of 1:1, or even greater, for maximum photosensitivity, and if lower chemical durability can be tolerated.

Individually, no one alkali metal oxide is required. However, we prefer to have lithia ($Li_2O$) present, although in limited amount. Thus, if the $Li_2O$ content is too high, photosensitivity is lost and only a yellow color is obtainable with small amounts. Accordingly, we prefer the cation ratio of $Li_2O$ to $R_2O$ ($Li_2O + Na_2O + K_2O$) to be at least 0.35, but not over about 0.65.

Glasses containing up to about 25% by weight $K_2O$ are photosensitive. However, there is a tendency for silver to reduce with a resulting coloration when the $K_2O$ content is above about 20%. We prefer, therefore, to limit the $K_2O$ accordingly. It will be noted, in the specific examples that follow, that a minor amount of $Na_2O$ normally is present in, and is introduced by, the $K_2O$ raw material.

The presence of an alkaline earth metal oxide (RO), such as CaO or BaO, tends to adversely affect photosensitivity. Therefore, while small amounts of these oxides may be tolerated under some circumstances, we prefer to avoid them. In any event, the cation ratio of RO:$R_2O$ should not exceed 0.25. Where BaO is present, a minor amount of SrO may be introduced in the BaO raw material.

In addition to the base glass components just discussed, the present glasses must contain the known photosensitive glass additives in the amounts normally used in silicate glasses. Thus, silver in amounts of 0.05-0.3% by weight are contemplated. Cerium oxide, in an effective amount up to about 0.05%, is necessary to promote photosensitivity. Antimony oxide ($Sb_2O_3$), in an effective amount up to 0.5% or so, also enhances photosensitivity and serves as a fining agent during glass melting. Finally, it is desirable, although not essential, to have a halogen ion selected from bromine, chlorine and mixtures, present in amounts up to 0.3% by weight.

The term "an effective amount" indicates that amount of the ingredient necessary to accomplish the desired result. In this application it represents the amounts of cerium oxide and antimony oxide necessary to sufficiently sensitize the glass to render the glass photosensitive. The actual amounts necessary in any given glass depend on the glass composition otherwise. In general, at least 0.01% by weight $CeO_2$ and 0.1% $Sb_2O_3$ are desirable.

SPECIFIC EMBODIMENTS

The invention is further illustrated by reference to several specific members of the glass family that are a characteristic feature of the invention. TABLES IA and IB set forth compositions of the exemplary glasses as calculated on an oxide basis from the glass batch. The compositions are expressed in parts by weigh tin TABLE IA, and in terms of cations in TABLE IB. The latter permits more accurate expression of certain definitive ratios. TABLE IA further shows, following the symbol PS, whether the glass exhibited photosensitivity. A zero indicates none and a plus (+) or double plus (++) indicates the degree of photosensitivity. Also shown are the photosensitive colors developed after a low temperature heat treatment (LT), namely 550° C. for 30 minutes followed by 600° C. for 30 minutes. The symbol HT indicates an additional 30 minute heat treatment at 650° C. and shown the significant differences in color that have been produce din some glasses by such additional treatment. Coefficients of thermal expansion (CTE) measured on certain glasses, and expressed as values $\times 10^{-7}/°$ C. (25°-300° C.), are presented. In TABLE IB, the cation ratio of ($R_2O$—$Al_2O_3$):$B_2O_3$ is shown under the symbol R.

TABLE IA

| Wt. | 1 | 2 | 3 | 4 | 5 | 6 | 7 | 8 |
| --- | --- | --- | --- | --- | --- | --- | --- | --- |

TABLE IA-continued

| | | | | | | | | |
|---|---|---|---|---|---|---|---|---|
| $SiO_2$ | 59.2 | 53.1 | 59.5 | 59.3 | 36.4 | 58.4 | 59.2 | 68.8 |
| $Al_2O_3$ | 2.8 | 8.5 | 0.56 | 15.7 | 3.1 | 2.8 | 2.8 | 2.7 |
| $B_2O_3$ | 16.9 | 15.4 | 19.4 | 8.9 | 31.5 | 16.7 | 16.9 | 14.8 |
| $Li_2O$ | — | 5.4 | 5.0 | — | 5.5 | 4.9 | 4.9 | 4.4 |
| $Na_2O$ | 20.5 | 0.16 | 0.15 | 25.2 | 0.21 | 0.13 | 0.19 | 0.13 |
| $K_2O$ | — | 16.9 | 15.8 | — | 22.9 | 15.4 | 15.5 | 13.7 |
| Ag | 0.106 | 0.107 | 0.107 | 0.104 | 0.092 | 0.105 | 0.106 | 0.103 |
| $Sb_2O_3$ | 0.40 | 0.40 | 0.40 | 0.40 | 0.26 | 0.40 | 0.40 | 0.40 |
| $CeO_2$ | 0.02 | 0.02 | 0.02 | 0.01 | 0.03 | 0.02 | 0.02 | 0.02 |
| F | — | — | — | — | — | 0.9 | — | — |
| Br | — | — | — | — | — | 0.3 | — | — |
| Cl | — | — | — | 0.3 | — | — | — | — |
| P.S. | + | ++ | + | + | ++ | ++ | ++ | ++ |
| Color | | | | | | | | |
| LT | yellow | brown | yellow | yellow | orange | yellow | purple | yellow |
| CTE | | | | | | | | 79.6 |
| HT | | green | | | | | green | |

| Wt. | 9 | 10 | 11 | 12 | 13 | 14 | 15 | 16 |
|---|---|---|---|---|---|---|---|---|
| $SiO_2$ | 74.9 | 65.3 | 61.9 | 48.0 | 51.2 | 44.8 | 56.4 | 56.2 |
| $Al_2O_3$ | — | 3.1 | 15.4 | 8.7 | 2.4 | 2.1 | 15.9 | 15.9 |
| $B_2O_3$ | 13.5 | 21.0 | 8.8 | 17.6 | 16.3 | 12.1 | 9.1 | 9.1 |
| $ZrO_2$ | — | — | — | — | — | 5.1 | — | — |
| $Li_2O$ | — | 9.9 | — | 6.0 | 3.1 | — | — | — |
| $Na_2O$ | 4.4 | 0.1 | 13.5 | 0.2 | 0.1 | 0.2 | 17.8 | 17.7 |
| $K_2O$ | 6.6 | — | — | 19.0 | 9.9 | 17.0 | — | — |
| BaO | — | — | — | — | 16.1 | 17.9 | — | — |
| SrO | — | — | — | — | 0.3 | 0.4 | — | — |
| Ag | 0.207 | 0.117 | 0.103 | 0.086 | 0.092 | 0.090 | 0.101 | 0.101 |
| $Sb_2O_3$ | 0.21 | 0.44 | 0.38 | 0.25 | 0.34 | 0.30 | 0.38 | 0.38 |
| $CeO_2$ | 0.03 | 0.021 | 0.015 | 0.030 | 0.016 | 0.014 | 0.014 | 0.014 |
| F | — | — | — | — | — | — | 0.3 | 0.3 |
| Br | — | — | — | — | — | — | — | 0.3 |
| Cl | 0.1 | — | 0.3 | — | — | — | — | — |
| P.S. | ++ | 0 | 0 | ++ | + | 0 | + | ++ |
| Color | | | | | | | | |
| LT | orange | white opal | — | brown | slight yellow | — | yellow | orange |
| CTE | 58.6 | | | 99 | | | | |

TABLE IB

| Cation | 1 | 2 | 3 | 4 | 5 | 6 | 7 | 8 |
|---|---|---|---|---|---|---|---|---|
| $SiO_2$ | 45 | 40 | 45 | 47.9 | 25.0 | 45.0 | 45.0 | 50.0 |
| $Al_2O_3$ | 2.5 | 7.5 | 0.5 | 15.0 | 2.5 | 2.5 | 2.5 | 2.5 |
| $B_2O_3$ | 22.2 | 20.0 | 24.0 | 12.5 | 37.3 | 22.2 | 22.2 | 20.0 |
| $Li_2O$ | — | 16.3 | 15.3 | — | 15.1 | 15.1 | 15.0 | 13.3 |
| $Na_2O$ | 30.3 | 0.25 | 0.22 | 24.5 | 0.3 | 0.2 | 0.3 | 0.2 |
| $K_2O$ | — | 16.3 | 15.3 | — | 20.1 | 15.1 | 15.0 | 13.3 |
| Ag | 0.045 | 0.045 | 0.045 | 0.045 | 0.035 | 0.045 | 0.045 | 0.045 |
| $Sb_2O_3$ | 0.125 | 0.125 | 0.125 | 0.125 | 0.075 | 0.125 | 0.125 | 0.125 |
| $CeO_2$ | 0.005 | 0.005 | 0.005 | 0.005 | 0.0075 | 0.005 | 0.005 | 0.005 |
| F | — | — | — | — | — | 0.9 | — | — |
| Br | — | — | — | — | — | 0.3 | — | — |
| Cl | — | — | — | 0.3 | — | — | — | — |
| R | 1.25 | 1.25 | 1.25 | 0.76 | 0.875 | 1.25 | 1.25 | 1.25 |

| Cation | 9 | 10 | 11 | 12 | 13 | 14 | 15 | 16 |
|---|---|---|---|---|---|---|---|---|
| $SiO_2$ | 65 | 45 | 50.9 | 35 | 45.0 | 45.0 | 45.0 | 45.0 |
| $Al_2O_3$ | — | 2.5 | 15.0 | 7.5 | 2.5 | 2.5 | 15.0 | 15.0 |
| $B_2O_3$ | 20.3 | 25 | 12.5 | 22.2 | 24.7 | 20.9 | 12.5 | 12.5 |
| $ZrO_2$ | — | — | — | — | — | 2.5 | — | — |
| $Li_2O$ | — | 27.4 | — | 17.6 | 11.1 | — | — | — |
| $Na_2O$ | 7.3 | 0.1 | 21.5 | 0.3 | 0.2 | 0.3 | 27.5 | 27.5 |
| $K_2O$ | 7.3 | — | — | 17.6 | 11.1 | 21.8 | — | — |
| BaO | — | — | — | — | 5.6 | 7.0 | — | — |
| SrO | — | — | — | — | 0.2 | 0.3 | — | — |
| Ag | 0.10 | 0.045 | 0.045 | 0.035 | 0.045 | 0.045 | 0.045 | 0.045 |
| $Sb_2O_3$ | 0.075 | 0.125 | 0.125 | 0.075 | 0.125 | 0.125 | 0.125 | 0.125 |
| $CeO_2$ | 0.010 | 0.005 | 0.005 | 0.0075 | 0.005 | 0.005 | 0.004 | 0.004 |
| F | — | — | — | — | — | — | 0.3 | 0.3 |
| Br | — | — | — | — | — | — | — | 0.3 |
| Cl | 0.1 | — | 0.3 | — | — | — | — | — |
| R | 0.725 | 1.0 | 0.50 | 1.25 | 0.8 | 0.9 | 1.0 | 1.0 |

Glass batches, based on the foregoing compositions, were formulated and mixed using conventional raw materials. Each batch was placed in a platinum or silica crucible and melted by heating to 1450° C. and holding for four hours. In each case, the melt was poured into 4"×8"×¼" slab molds and annealed to prepare samples for further treatment.

To develop coloration, a glass slab was exposed to a fluence of about 30–300 mJ/cm$^2$. For example, this may be the collimated output of a one thousand watt mercury-xenon arc lamp, the fluence depending on the time of exposure. The glass slab was then heated in a furnace at temperatures between 550° C. and 675° C. for approximately one half hour at each temperature step.

With reference to the exemplary glasses of TABLES IA and IB, it may be noted that Examples 13 and 14 illustrate the effect of divalent oxides such as BaO and SrO. Thus, Example 13, with a RO:R$_2$O cation ratio of about 0.25, is marginal in that it exhibits slight photosensitivity. Example 14, with a ratio of about 0.33, is well outside the range and exhibits no photosensitivity.

The effect of lithia is also readily apparent. Thus, the glasses of Examples 3 and 7, when subjected to a further heat treatment at 650° C. for 30 minutes, exhibited a green color not generally attainable in photosensitive glasses. In the absence of lithia, only the yellow color, typical of absorption due to spherical silver colloids, is observed. The glass of Example 10, containing a high content of Li$_2$O, but not Na$_2$O or K$_2$O, became a white opal when heat treated. This suggests that lithia alone tends to promote phase separation in a glass.

Example 11 illustrates a glass wherein the R$_2$O content is relatively low, particularly in the presence of a high alumina content. The result is a low ratio of (R$_2$O—Al$_2$O$_3$):B$_2$O$_3$, and, consequently, no photosensitivity. The overall teaching then is that, with a proper relationship of total alkali metal oxide, alumina and boric oxide established, and particularly with a controlled amount of lithia present, a fine scale phase separation can be induced which provides structures that yield colors other than yellow.

The color hue developed in a glass depends on both the amount of irradiation and the temperature at which the glass is heated subsequent to irradiation. For example, samples of glass 7 were exposed for variable times and then heated to 650° C. for a half hour. The TABLE below shows the time of exposure and the resulting color observed for each sample.

TABLE 2

| Sample | Exposure Time (min) | Color |
| --- | --- | --- |
| 1 | 4 | yellow |
| 2 | 12 | green |
| 3 | 20 | reddish brown |

When the same glass was heated to 600° C. after a 12 minute exposure, a magenta color was produced.

The influence of heat treatment on photoinduced color in borosilicate glasses is further shown in the accompanying drawing. The drawing is a graphical representation of light transmission wherein wavelength in nanometers is plotted on the horizontal axis and optical density (absorptance) is plotted on the vertical axis.

The plotted data were obtained by measuring samples of glass 7 in the TABLE above which were exposed to the mercury-xenon lamp for 12 minutes and heat treated for a half hour at the temperature indicated on each curve.

In order to determine the effect of composition on chemical durability, several of the new glasses were subjected to what is commonly referred to as the HCl test. In this test, a glass sample is immersed in a 5% by weight hydrochloric acid (HCl) solution at 95° C. for 24 hours. The sample is weighed before and after the treatment and the difference is reported as a calculated weight loss in mg/cm$^2$ of exposed glass surface. Among the glasses tested were those of Examples 8, 9 and 12. The reported results were:

| Ex. | Chem. Dur. (mg/cm$^2$) |
| --- | --- |
| 8 | 0.4 |
| 9 | 0.014 |
| 12 | 100. |

It is readily apparent that good chemical durability is favored by higher silica content in a glass, and consequent diminishment of the modifying oxides.

We claim:

1. A photosensitive borosilicate glass which, on an oxide basis as calculated from the glass batch in weight percent, consists essentially of 20–80% SiO$_2$, 8–40% B$_2$O$_3$, 0–6% Li$_2$O, 0–28% Na$_2$O, 0–25% K$_2$O, the Na$_2$O+K$_2$O content being 10–28%, 0–18% Al$_2$O$_3$, the cation ratio of (R$_2$O—Al$_2$O$_3$):B$_2$O$_3$ being at least 0.6, 0.05–0.3% Ag, an effective amount to promote photosensitivity up to about 0.05% cerium oxide, and an effective amount to enhance photosensitivity and fine the glass up to 0.5% Sb$_2$O$_3$.

2. A photosensitive borosilicate glass in accordance with claim 1 wherein the cation ratio of (R$_2$O—Al$_2$O$_3$):B$_2$O$_3$ is at least 0.75.

3. A photosensitive borosilicate glass in accordance with claim 1 wherein the cation ratio of (R$_2$O—Al$_2$O$_3$):B$_2$O$_3$ is at least about 1.

4. A photosensitive borosilicate glass in accordance with claim 1 additionally having an RO content in an amount such that the cation ratio of RO:R$_2$O does not exceed 0.25.

5. A photosensitive borosilicate glass in accordance with claim 1 wherein the glass composition includes Li$_2$O in such amount that the cation ratio of Li$_2$O to total R$_2$O is between about 0.35 and 0.65.

6. A photosensitive borosilicate glass in accordance with claim 1 wherein the SiO$_2$ content is 50–65%, the B$_2$O$_3$ content is 10–20%, the Li$_2$O content is 5–6%, the Na$_2$O content is 0–25%, the K$_2$O content is 0–20%, the Na$_2$O+K$_2$O is 10–25% and the Al$_2$O$_3$ content is 0–10%.

7. A photosensitive borosilicate glass in accordance with claim 6 wherein the Li$_2$O content is such that the cation ratio of Li$_2$O to total R$_2$O is between about 0.35 and 0.65.

8. A photosensitive borosilicate glass in accordance with claim 1 wherein the glass additionally contains up to 0.3% of a halide selected from chloride, bromide and mixtures.

* * * * *